United States Patent [19]

Everett et al.

[11] Patent Number: 5,177,563
[45] Date of Patent: Jan. 5, 1993

[54] METHOD AND APPARATUS FOR LOCATING PHYSICAL OBJECTS

[75] Inventors: Louis J. Everett, College Station; Tsing-Wong Hsu, El Paso, both of Tex.

[73] Assignee: Texas A&M University System, College Station, Tex.

[21] Appl. No.: 305,472

[22] Filed: Feb. 1, 1989

[51] Int. Cl.$^5$ .......................... G01B 11/00; B25J 9/00
[52] U.S. Cl. .................................... 356/375; 901/47; 395/94
[58] Field of Search .......................... 901/47, 3, 9, 46; 250/222, 222.1, 561; 356/372, 375, 387, 376; 395/89, 93, 94; 364/571.01

[56] References Cited

U.S. PATENT DOCUMENTS

| | | | |
|---|---|---|---|
| H65 | 5/1986 | Beni et al. | 414/730 |
| 3,888,362 | 6/1975 | Fletcher et al. | 901/16 |
| 4,423,998 | 1/1984 | Inaba et al. | 44/730 |
| 4,575,802 | 3/1986 | Walsh et al. | 364/513 |
| 4,615,615 | 10/1986 | Krolak et al. | 901/35 |
| 4,623,183 | 11/1986 | Aomori | 294/86.4 |
| 4,653,793 | 3/1987 | Guinot et al. | 294/86.4 |
| 4,766,322 | 8/1988 | Hashimoto | 901/47 |
| 4,982,611 | 1/1991 | Lorenz et al. | 73/862.04 |

FOREIGN PATENT DOCUMENTS 3231830  3/1983  Fed. Rep. of Germany ...... 356/375

OTHER PUBLICATIONS

S. Acquaviva, G. Belforte, R. Ippolito, and A. Romiti, "A New Measuring System for Robot Precision," Eighth Annual British Robot Association Conference, pp. 13–22 (May 1985).

J. S. Shamma, & D. E. Whitney, "A Method for Inverse Robot Calibration," Journal of Dynamic Systems, Measurement and Control, vol. 39, pp. 36–43 (Mar. 1987).

W. K. Veitschegger, & Chi-haur Wu, "A Method for Calibrating and Compensating Robot Kinematic Errors," Robotics and Automation, pp. 39–44 (IEEE Computer Society Press, 1987).

D. E. Whitney, C. A. Lozinski, & J. M. Rourke, "Industrial Robot Forward Calibration Method and Results," Journal of Dynamic Systems, Measurement and Control, vol. 108, pp. 1–8 (Mar. 1986).

K. Lau, R. J. Hocken, & W. C. Haight, "Automatic Laser Tracking Interferometer System for Robot Metrology," Precision Engineering vol. 8, (1:3) (Jan. 1986).

B. W. Mooring, "The Effect of Joint Axis Misalignment on Robot Positioning Accuracy," Proceedings of Computers in Engineering Conference, vol. 2, pp. 151–155 (1983).

Chi-haur Wu, "The Kinematic Error Model for the Design of Robot Manipulator," 1983 American Control Conference, (San Francisco, Jun. 22–24), pp. 497–502.

B. W. Mooring, & G. R. Tang, "An Improved Method for Identifying the Kinematic Parameters in a Six Axis Robot," Proceedings of the 1984 International Computers in Engineering Conference and Exh.

(List continued on next page.)

*Primary Examiner*—Hezron E. Williams
*Assistant Examiner*—Michael J. Brock
*Attorney, Agent, or Firm*—Arnold, White & Durkee

[57] ABSTRACT

A system for robot manipulator calibration by locating a physcial object by determining the position of the object relative to a sensor, which is attached to the manipulator. The sensor consists of a support member and at least three sensor members which are mounted to the support member and are arranged to make tangential contact with a curved surface, preferably a spherical surface, simultaneously at three spaced points on the surface, upon such contact the object is deemed to be "located". Tangential contact is accomplished by the use of light beams as sensors.

6 Claims, 3 Drawing Sheets

OTHER PUBLICATIONS

H. W. Stone, A. C. Sanderson, & C. P. Neuman, "Arm Signature Identification," IEEE International Conference on Robotics and Automation, San Francisco, Calif., pp. 41–48 (1986).

M. R. Driels, & U. S. Pathre, "Robot Manipulator Kinematic Compensation Using a Generalized Jacobian Formulation," Journal of Robotic Systems, vol. 4(2), pp. 259–280 (1987).

B. W. Mooring, & T. J. Pack, "Determination and Specification of Robot Repeatability," Proceedings of IEEE International Conference on Robotics and Automation, vol. 2, pp. 1017–1023.

A. Kumar, & D. J. Waldron, "Numerical Plotting Surfaces of Positioning Accuracy of Manipulators," Mechanism and Machine Theory, vol. 16, pp. 361–368 (1981).

J. Chen & L. N. Chao, "Positioning Error Analysis for Robot Manipulators With All Rotary Joints," IEEE International Conference on Robotics and Automation, vol. 2, pp. 1011–1016.

METHOD AND APPARATUS FOR LOCATING PHYSICAL OBJECTS

BACKGROUND OF THE INVENTION

In a general aspect, this invention relates to machines that are designed to repeatably and reliably manipulate objects or move them to a specific location. Such machines, often called "manipulators," are typically found on industrial robots, milling machines, coordinate measuring devices and the like. In a more specific sense, the present invention is directed to industrial robots.

Industrial robots are used for a variety of purposes and tasks. Our society is looking more and more to robots for performing the more tedious and mundane jobs of life. Making automobiles and microcomputers are just a few of their many applications.

One of the simplest types of industrial robots is the so-called "pick and place" robot. This type of robot may be, for example, electrically, pneumatically, or hydraulically driven; and is usually characterized by movement between predetermined limits, which are set by hard stops or microswitches. Another type of robot is a "continuous path" robot, which is somewhat more sophisticated than pick and place robots in that it can be driven to many different positions within its operating space. One example of a continuous path robot is the Unimate PUMA robot.

Robot manipulators typically share certain features and characteristics. Each manipulator usually includes a base, several rigid bodies connected by joints, and a tool or end effector. While the base of the robot manipulator is usually stationary, the joints are free to move. These joints are usually either "revolute" or "prismatic." Revolute joints are hinged; they may be compared to human elbows and knees. Prismatic joints are telescopic or extendable; they may be compared to telescopes or car antennae. The end of the manipulator, called the "tool" or "end effector," is also typically free to move. This tool is like the hand of the robot manipulator and may include a mounted gripper or some other device useful for manipulating objects. After grasping the object with the gripper, the robot can move or change the position of the object. When the robot is automated or computer-programmed, it can be made to perform these tasks over and over. Thus, computers in the robot can be programmed to "tell" the robot what to do.

One way to improve a robot's reliability, which is rather time consuming, is to "show" or "teach" the robot what to do. Here, the robot manipulator is manually taken through its operational path, from the point where it grasps the object or workpiece to the point where it releases it. At certain points in its operational path, the manipulator may be stopped, and its joint values taken and recorded. Many conventional robots have internal systems that automatically report joint values. These joint values can be fed to the robot memory for later reference. When the time comes for the robot to do its job, it "remembers" the joint values that correspond to the desired position and performs its task accordingly. Such manual methods of collecting position data (commonly called "teaching") can be time consuming, tedious, and inconvenient. Each time a joint is adjusted or replaced or a new workpiece is placed in the work space, the operator must repeat the data collecting process.

Another way to improve reliability is to "tell" the robot how to perform a given task. This is usually better than "showing" because it can be done automatically, e.g., by computer. But it is also usually more complicated. The mechanical relationships, i.e., the distances and angles, between the joints must be converted to mathematical relationships. When robots are "told" how to move, they are told using a mathematical language. If the mathematical language is not accurately translated into mechanical language, the manipulator will not always move as it is told.

Manipulator calibration is an important part of "telling" a robot how to perform a task. Generally speaking, calibration involves determining the proper relationship between the position of the manipulator tool and its working environment, or work space. One type of calibration is called "work space calibration," which involves determining the position and orientation of a robot base relative to a fixture in the work space.

Another type of calibration is called "kinematic calibration," which is somewhat more sophisticated. This is often called "Level II calibration", and involves "mapping" joint configurations. Essentially this "mapping" is done by measuring joint-tool relationships at a number of locations and performing a regression analysis to fit model parameters to the measurements. Various mathematical algorithms are available for calibration. But prior to calibration, the joint-tool measurements, or "position data," must first be collected.

A problem often lies in collecting these "position data." Mathematical models are available for calculating the relationship between the tool and the joints. But for various reasons which include manufacturing tolerances, the mathematical relationship does not always correspond to the real-life mechanical relationship.

Various sensor devices, calibration methods, and position measuring devices have been used to collect measurements. These approaches may involve physical pointers, theodolite systems, sonic systems, electronic sparking mechanisms, and even lasers. But these approaches collectively have problems.

For example, sonic calculations are sometimes sensitive to temperature and humidity. Other systems are prone to human error and hence are unreliable. Other systems, which employ light beams, rely on manipulator velocity and angles of intersection between the light beams. Others are complex or expensive to produce. Still others such as the theodolite method are tedious and time consuming. Collectively, the shortcomings of conventional devices and methods demonstrate a continuing need for a better system for kinematic calibration.

SUMMARY

This invention is directed to a system for robot manipulator calibration, particularly kinematic calibration. More generally, this invention is directed to a system for locating a physical object by determining the position of the object relative to a sensor, which is attached to a manipulator by establishing three-point contact between the sensor and the object. Accordingly, in a more specific aspect, the invention resides in a fixed configuration of at least three sensor members which simultaneously touch or make point contact with the physical object. One embodiment includes moving the configuration until the sensor members make simultaneous point contact with the object. Another embodiment includes moving the object until it contacts the sensor members. In either case, at the point of such contact, the physical object is deemed to be "located."

A sensor of the invention in a broad aspect comprises a housing or support member and at least three sensor members which are mounted, fixed, or attached to the support member and are arranged or configured to make tangential contact with a curved surface, preferably a spherical surface simultaneously at three spaced points on the surface. Preferably, the spherical surface is a sphere, and three such spheres are mounted on a support member or plate. The ascertainable relationship or "trip point" between the three sensor members of the sensor and the sphere has been found to be especially important for robot calibration. Using this special relationship, a sensor attached to the end of a robot manipulator may be brought to the edge of the sphere from a number of different directions. The sphere is preferable to other shapes because the distance from the edge of the sphere to the center is always the same. Thus, regardless of the direction of contact with the sphere, at the trip point the sensor will always have the same relationship to the center of the sphere.

A preferred embodiment of the sensor comprises light beams which make tangential contacts with a sphere. The sensor beams, in a further preferred aspect, are capable of locating the three-dimensional position of an object without reference to the velocity of the sensor in relation to the object. Thus, a preferred embodiment of the sensor includes a set configuration of at least three light beams arranged to define or ascertain a fixed relationship with a spherical object when a trip point is reached. The sensor may be connected to a switch which tells a responsive controller the spatial position of any sphere or other suitable object that contacts the sensor members. In accordance with the invention, the sensor may be part of an object-locating apparatus, a manipulator calibration tool, a gripping device, or other similar member.

Although the invention is broadly directed to locating physical objects, a more specific and preferred aspect of the invention includes a system for collecting robot manipulator data, particularly tool pose corresponding to manipulator joint parameters. The term "pose" is used herein to reflect the position and the orientation of a tool. Preferably, this latter aspect involves the use of a sensor having an offset light-emitting diode (LED) configuration and at least three spheres mounted to a fixture which is located in the manipulator work space. The manipulator may be calibrated by locating the spheres on a coordinate system using the sensor, and recording joint values at positions defined by the coordinate system.

Another aspect of this invention resides in a novel fixture coordinate system. This system may be used in cooperation with a sensor for manipulator calibration. In a preferred form, the coordinate fixture comprises four spheres mounted to a plate which are contacted by a sensor attached to a manipulator. Three of the spheres define a fixture coordinate system, and the fourth may be used to verify identifications by the other three spheres. One of the three spheres may be employed as the origin of the coordinate system with coordinates (0, 0, 0). A second sphere may define the X-axis, and the third sphere the Y-axis. The plane defined by these points may be useful in establishing the independent parameters of a robot manipulator.

When the system of the invention is used in calibrating a robot arm or other articulated member, a sensor is mounted on the tool end of the arm and brought into trip point relation to each sphere. Either the sensor or the fixture may be kept stationary and the other device moved to establish the trip point relationship. In general, it is desirable that several such positional relationships be employed, so that the robot arm can be calibrated using various joint configurations. It is also preferred that at least some of the positional relationships approximate actual working positions of the robot arm.

As noted earlier, it is preferred that the sensor comprise an assembly of three sensor members capable of making joint, non-mechanical point contact with a coordinate fixture. It is further preferred that the fixture comprises an assembly of at least three, and optionally four, spherical members arranged to define a coordinate system. In the case in which the fixture is kept in a fixed position, the assembly of three sensor members is brought separately into trip point relation with each spherical member. At each trip point, calibration data are taken for the position of the arm and its joints. Any changes in the joints occasioned by wear or the like are made the subject of adjustment or correction such that the arm will assume the desired positions in actual operation. It will be noted that this sensor fixture combination is especially desirable in that it enables a trip point to be reached from several different approaches of the robot arm relative to the fixture.

In any given installation it will be preferred to position the coordinate fixture at a common point for each calibration of a robot arm. The coordinate fixture may even be incorporated into the robot manipulator where, for example, three spheres are attached to the manipulator base. Any variations in the arm's dimensions or position relative to the fixture will thus be more readily ascertainable. The preferred three-point positioning mechanism of the sensor, especially when used with a spherical fixture, further facilitates calibrations by providing a known reference plane bearing a known physical relationship with the sphere.

DETAILED DESCRIPTION AND SPECIFIC EMBODIMENTS

A. Sensor for Locating Physical Objects

Figure 1:
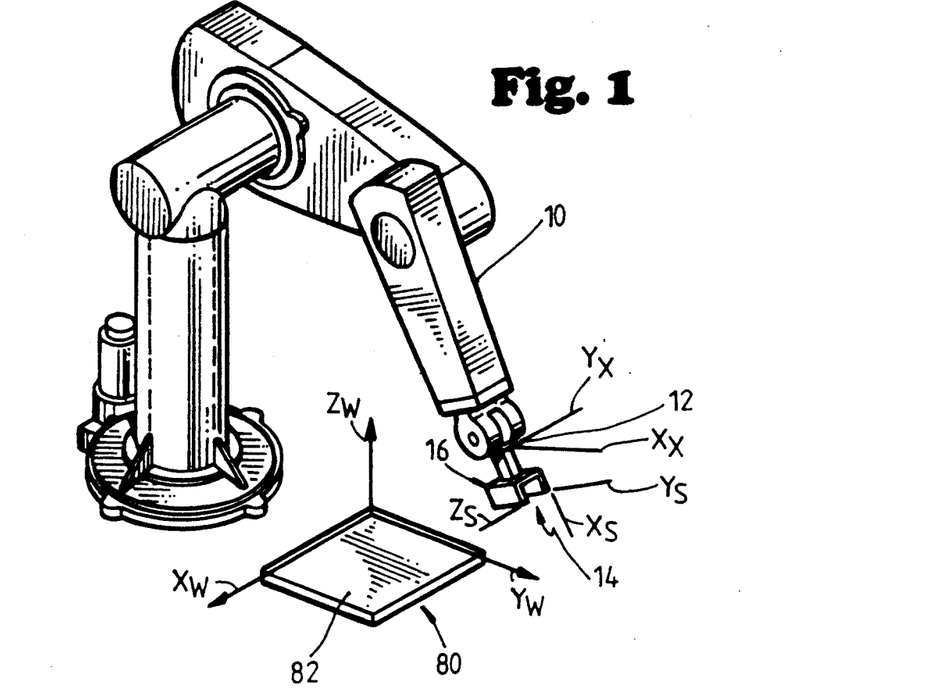
FIG. 1 is a perspective view of a robot manipulator with a sensor attached to the end effector and a coordinate fixture, absent the spheres, placed in the work space.
Figure 2:
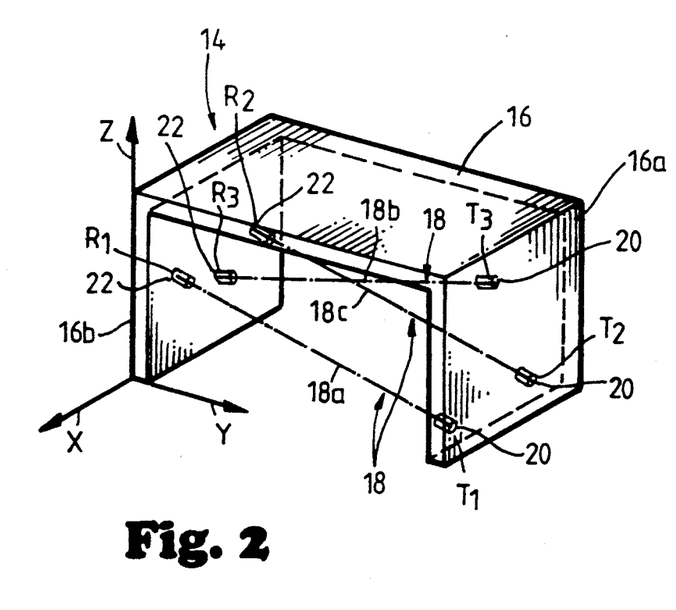
FIG. 2 is a perspective view of a sensor having three offset LED beams which serve as sensor members.
Figure 3:
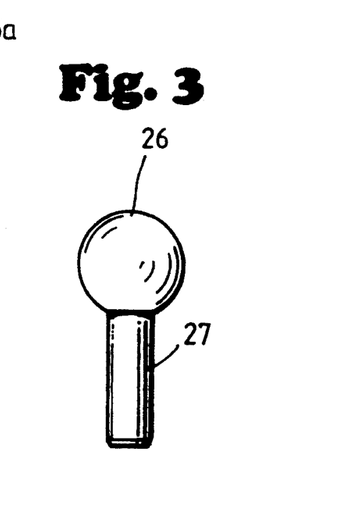
FIG. 3 is a side view of a sphere which may be used to trip the sensor. Three of such spheres may be mounted to a plate to form a coordinate fixture.

Referring to FIGS. 1-5, a preferred apparatus embodiment of the invention includes a sensor 14, which comprises at least three light beams 18 configured to simultaneously and tangentially touch an object such as the sphere 26 shown in FIG. 3, which may be mounted on a plate 80 located in a manipulator work space, as shown in FIG. 1. The three light beams 18 emitted by the light-emitting members 20 are arranged in a pattern that defines a trip point relationship between the light beams and a sphere 26. Using this sensor, a spherical object 26 may be located, data collected, and the manipulator 10 calibrated.

Referring to FIG. 2, the sensor 14 comprises a housing 16 which functions as a support member, and which may be attached to a manipulator tool 12. In FIG. 2, each sensor member comprises a transmitter 20 and a receiver 22. When activated, the sensor members define a configuration of light beams 18 (18a, 18b, 18c) which are capable of a trip point relationship with sphere 26. This trip point relationship is seen in FIGS. 4 and 5.

Although light beams 18 are a preferred means of defining such configuration and establishing trip point contact with sphere 26, they are not the only means. For example, another embodiment involves using rods or wires rather than transmitters 20 and receivers 22 as sensor members. The rods or wires may be configured just like the light beams 18 shown in FIG. 2. Point contact may be determined visually or by electronic means. In the case of electronic means, for example, the sphere 26 may be grounded, and a current may be passed through each rod or wire, which should be made of a conductive material such as steel. When point contact is made, the current flowing to the ground through the sphere 26 causes a short circuit across the rod or wire. A signal attached to the sensor and responsive to such short circuit indicates when point contact is made. Still another embodiment involves using sensor members shaped like spheres in place of the light beams, rods, or wires. Three spherical sensor members in close spatial relation to one another are attached to the housing, support member, or manipulator tool end itself. Trip point relationship with a sphere 26 is established when each spherical sensor member simultaneously makes point contact with the sphere 26.

Figure 4:
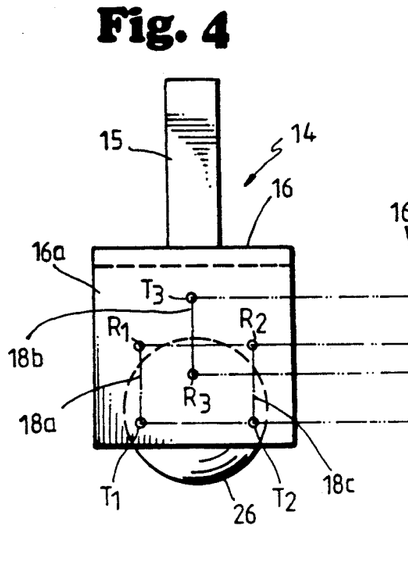
FIG. 4 is a front view of a sensor with a sphere in trip point relation to the sensor.
Figure 5:
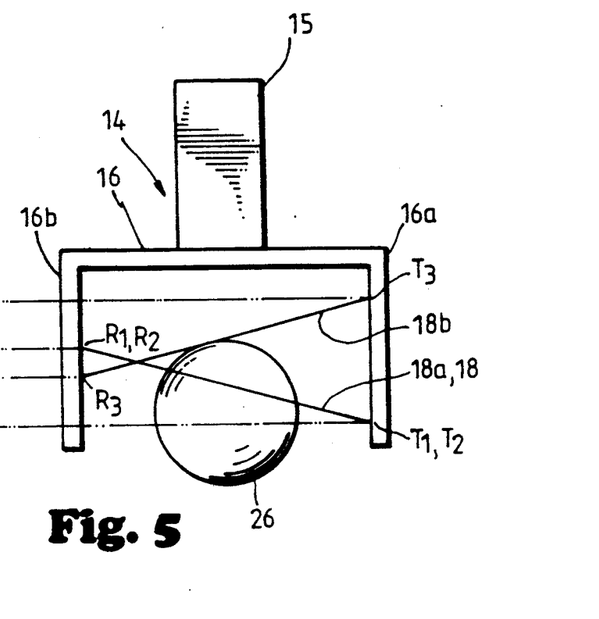
FIG. 5 is a side view of the sensor of FIG. 4 with a sphere in trip point relation to the sensor.

FIGS. 2, 4 and 5 show a sensor 14. The housing 16 of sensor 14 in FIGS. 4 and 5 has a gripping bar 15 which is not shown in FIG. 2. Although the sensor shown in FIG. 2 has a "nest-type" or U-shaped housing, in a broader aspect the shape of the housing or support member is not critical. For example, the support member may be flat with the sensor members protruding outward in claw-like fashion to define a trip point. Alternatively, the support member may be a rod having sensor members mounted in a configuration that defines a trip point relationship to a sphere. As will be apparent it is desirable that the sensor define a geometric relationship so that a sphere may make trip point contact in a manner that is repeatable and precise from various poses.

In a preferred embodiment, the sensor is used to locate a spherical object. Spheres are preferable because all edges of the sphere are equidistant from the sphere center. FIG. 3 shows a sphere 26 which includes a shank 27. The sphere 26 can be attached to a plate 82 (seen in FIG. 6) by inserting the shank 27 into holes drilled in the posts P1, P2, P3, and P4 or directly into holes drilled in the plate 82. When the sensor 14 locates or contacts a sphere 26 and the sensor is mounted on a manipulator arm 10 (seen in FIG. 1), useful measurements pertaining to the joint configuration of the respective manipulator can be taken. For many robots, the joint configuration can be automatically determined.

The trip point of the present invention is a term denoting a spatial relationship between the sphere 26 and the sensor. Simultaneous three-point contact between the sphere and the sensor members establishes such trip point relationship. At the trip point, the sensor members should simultaneously "barely touch" the sphere. In this manner, the sensor has located or "found" the center point of the sphere. Thus, the sensor is a non-physical point sensor which locates a point without touching it. At the trip point, the relationship between the sensor and the center of the sphere is constant. Moreover, when the sensor is firmly attached to the tool of the manipulator, the relationship between the tool and the center of the sphere is also constant. These constant values are important for calibrating a manipulator.

In some cases the location of the center of the sphere may be important. For example, when the sensor is used in conjunction with a gripper to accurately grasp irregularly-shaped workpieces, the location of the sphere center may be important. A simple calibration procedure is provided to determine this location. One such procedure is discussed in Section E entitled "Sensor Calibration Apparatus and Procedure."

Referring to FIGS. 1-2, the U-shaped nest or housing 16 of the sensor 14 preferably comprises a light-emitting diode ("LED") system, and the entire assembly may be attached to the tool or end effector 12. FIGS. 4 and 5 show a housing 16 which has a gripping bar 15 attached thereto and centered over the center of the sphere 26 for gripping by a manipulator gripper. The LED system, when activated, creates the light beams 18 that define the trip point when contacting a spherical surface. The LED system preferably includes beam transmitters 20 ($T_1$, $T_2$, $T_3$), beam receivers 22 ($R_1$, $R_2$, $R_3$), and switches (not shown) corresponding to each receiver 22.

Each switch may be a conventional electrical switching mechanism and should be located in the proximity of the manipulator 11. The switch may be connected by wiring or some other means to the LED receiver. In a specific embodiment of the invention, the switch delivers electronic output signals to a suitable controller. Typically, the controller is part of the robot but is located away from the manipulator. The controller is preferably automatic, that is, it is computer-programmed to respond to output signals in a predetermined manner. The controller will generally be programmed to move the sensor 14 in response to output signals given to it by the switch. However, the sensor may also be moved by hand.

In general, the switch is responsive to interruption or contact with the light beams. Thus, the switch responds when the trip point is reached. When an on-off signal ("go-no go" feedback) is used, the switch sends one level of output signals when the beams are untouched, and another level of output signals when the beams are touched, i.e., interrupted. The switch may be designed to send a certain level of output signals proportional to the intensity or amount of light received by the beam transmitter. The switch may also be adjustable to trigger or "switch off" at the slightest interruption of the beams 18.

An alternative embodiment of the invention uses "analog" feedback. For example, the light beams may be used to direct the switch to establish certain levels of voltage in response to their interaction with the spheres or other objects. Voltage values corresponding to spatial position (three dimensional) could be used to identify the trip point rather than relying on observation or "go-no go" feedback. A voltmeter would indicate the spatial position of the sphere. The voltmeter would be responsive to the interaction between the sphere 26 and the light beam 18. The voltmeter separately records voltage proportional to the amount of light received by each receiver 22. Maximum voltage would indicate a non-interrupted light beam, while zero voltage would indicate complete interruption. The voltmeter would also indicate degrees of interruption between maximum and zero values. The sensor could be calibrated using these voltage values by correlating the voltage values for each receiver with the location of the sphere when it is at trip point relationship to the sensor. Sensor calibration is discussed in Section E.

The number and configuration of the beams affect the design of the system. In the sensor pictured in FIG. 2, the photodiode array has only three LED light beams 18. When the trip point is achieved by touching a sphere, three light beams are a significant lower limit; more can be used but are not necessary. Indeed, too many light beams may complicate the locating procedure. When the sensor 14 is used for collecting manipulator data, the beams 18 should be positioned close enough to one another to be able to simultaneously and tangentially touch the sphere 26. Thus, a smaller sphere 26 would require a closer configuration of beams 18. Preferably, the beams 18 are not all parallel with each other. At least one of the beams or sensor members 18 should be offset, i.e., non-parallel with the other members 18. Otherwise, an ascertainable trip point relationship with a sphere 26 would not be easily and conveniently defined.

Figure 6:
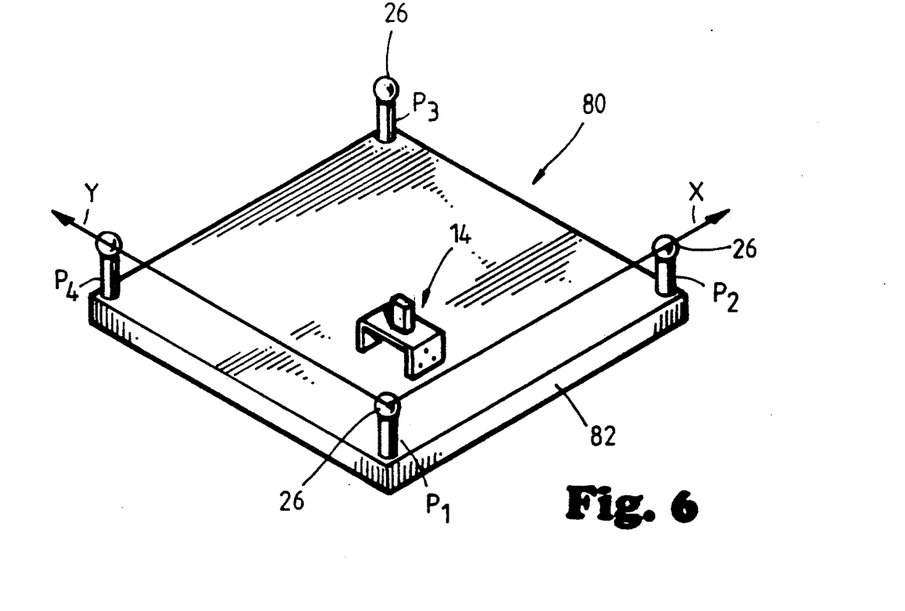
FIG. 6 is a perspective view of a multi-sphere coordinate fixture having 4 spheres mounted on posts attached to the fixture; and a sensor positioned in space next to one of the spheres.

Thus, in FIGS. 2, 5 and 6, the beams 18 are "offset." Each beam 18 is transmitted from an LED transmitter or light emitting member 20 ($T_1$, $T_2$, $T_3$) on one side of the housing 16 and received at an LED receiver or light receiving member 22 ($R_1$, $R_2$, $R_3$) on the opposite side. Two of the beams 18a, 18c are substantially parallel and separated by a distance somewhat smaller than the diameter of the sphere 26. The third beam 18b is disposed between the first two beams 18a, 18c and intersects the plane formed by these beams at an angle of about 30 degrees. Perfect alignment or precise angles of the members are not required, nor is it necessary to know the exact positions of the beams 18 to achieve good calibration results.

In addition to the "offset" configuration, a multitude of other configurations could conceivably define a trip point relationship when the members establish point contact with a spherical surface. All the beams 18 could, for example, cross each other in a single plane to form sides of a triangle. If a sphere 26 were used in conjunction with the light beams to achieve a trip point relationship, the sphere would have to be large enough to touch all beams simultaneously. At the trip point, the sphere would rest on one side of the triangle created by the beams at the trip point.

The sensor 14 shown in FIG. 2 has several advantages. It may be manufactured easily and provide repeatable positioning. It is relatively simple, inexpensive and accurate. It may be adapted to provide feedback to a manipulator controller. This may be accomplished by, e.g., installing an electrical feedback mechanism within the sensor 14 to signal when the sensor members 18 have reached a trip point relationship with the sphere 26. This feedback may be used to drive the manipulator automatically, thus enabling the automatic collection of calibration data. Such feedback may include "go" and "no-go" type information that may be interfaced to digital input lines of a control system. Such feedback may alternatively include analog information, i.e., feedback based on numerical variable quantities such as voltage. Voltage-based feedback is especially appropriate when the sensor is to be calibrated (discussed later). Position data may be fed back to a manipulator controller so that the sensor may be operated automatically. However, even when the sensor is made to give simple "go/no-go" information, it may be interfaced with conventional manipulator controllers for accurate automatic, calibration data.

B. Methods for Locating Physical Objects and for Collecting Manipulator Measurements Another broad aspect of this invention provides a method for locating a physical object, which is preferably a sphere, comprising moving a sensor having a fixed configuration of at least three sensor members to trip point contact with the physical object. By "locating" it is meant that the three-dimensional position of the object may be determined and preferably expressed in mathematical terms. Preferably, the method of this invention involves the use of a sensor such as the one described above. The method may be used to yield manipulator measurements, to calibrate the manipulator, and to help grippers grasp objects more effectively.

A specific embodiment of the invention is seen in FIG. 3, where a sphere 26 is seen attached to a peg or shank 27. Preferably, the method involves causing the sensor to touch or contact the sphere 26 at the trip point, i.e., so that the sensor members simultaneously and tangentially touch the edges of the sphere. This trip point contact is seen in FIGS. 4 and 5. Establishing trip point contact may involve moving the sensor to the sphere or moving the sphere to the sensor. In a further aspect, when a sensor mounted on a manipulator arm locates at least three spheres fixed in known relationship on a plate or support member, a method is provided for calibrating the manipulator by causing the sensor members to tangentially and simultaneously contact each sphere in a manner and for a number of times sufficient to calibrate the manipulator. Each time trip point contact is made, the pre-determined location of the spherical object is correlated with the manipulator joint configuration. When a sufficient number of correlations is made with the spherical objects arranged in a known coordinate system, the manipulator may be calibrated.

Accordingly, further aspect of the invention provides an apparatus and method for providing manipulator measurements. When manipulator measurements, e.g., orientation data and position data, are taken, the object that is "located" by the sensor is preferably a sphere. The sphere should be as precisely spherical as possible. The sphere should also be large enough to "trip" the sensor. The trip point between the sensor and the sphere occurs when all the sensor members of the sensor engage in point contact with the sphere. Thus, when the sphere trips the sensor, the sensor defines a single point which may be mapped to or correlated with a set of particular joint values of the manipulator. These joint values in turn may be used for calibration.

C. Manipulator Calibration

As stated earlier, this invention has particular application to the calibration of a manipulator. People usually first calibrate a robot manipulator when the manipulator is installed in a workplace. A manipulator may also be calibrated if it has suffered some kind of damage to the rigid bodies or joints or if a part on the manipulator has been replaced. Besides these cases, the need to calibrate the manipulator may vary, depending on the type of manipulator. For instance, this invention provides for the calibration of conventional robot manipulators, such as the Unimate PUMA, IBM Enterprise, and IBM 7565.

Generally, three reference frames are involved, that of the environment or "world," the sensor, and the tool. The "world" reference frame is defined by a coordinate fixture comprising three spheres attached to a support member. The distance between each pair of spheres is measured, and X-Y-Z coordinates are assigned to each sphere to establish a plane. The coordinates are obtainable by a conventional coordinate measuring device. Generally speaking, the sensor and tool reference frames are constant relative to each other. This constant relationship may be determined by a sensor calibration procedure, discussed below in Sections E and F.

A calibration algorithm in accordance with the present invention should utilize one world frame and one tool frame. The algorithm should seek a single relationship between the two frames. Generally, the single relationship should be accurate over the entire manipulator work space. Because of non-kinematic error sources, a single accurate relationship may be difficult to determine. Nevertheless, by dividing the work space into several small regions and defining a single world reference frame for each region, it is possible to relate tool pose and joint configuration using multiple single relationships, one for each world reference frame. Thus, without being bound by theory, it is believed that, over small volumes, the manipulator may be modelled as "purely kinematic." Since a calibration is performed at each world reference frame, and a purely manual process would usually take too long, the procedure is preferably automated, e.g., performed by computer and controller.

A sensor capable of repeatably contacting the spheres is also provided, wherein the sensor is the same distance from the center of the sphere at the point of contact. A sensor having three sensor members which are capable of trip point contact with each sphere is appropriate for making repeatable contact with the spheres. Such a sensor has been previously described in detail and an embodiment is seen in FIG. 2, 4 and 5.

One of the objectives of kinematic calibration is to identify the independent kinematic parameters of a robot manipulator. Such parameters are recognized in the art. Each robot manipulator has its own set and number of parameters. For example, the number of parameters in the IBM Enterprise is 24. Three of these produce zero position error. The remaining 21 of these 24 may be identified by measuring the position of the manipulator. The number of independent parameters for the PUMA robot, in contrast, is 30, of which 27 are identifiable by measuring manipulator position.

To identify these kinematic parameters, a sensor is fixed to the tool end of the manipulator. Measurements are collected by causing the sensor to make trip point contact with each sphere on a three-sphere coordinate fixture. Each time the sensor trips a sphere, the manipulator is stopped, and a joint configuration is recorded, composed of the joint values of the manipulator in that particular position. Most robot manipulators are capable of automatically reading joint values at a certain joint configuration. These joint values are correlated with the coordinates assigned to that sphere comprising three parameters which represent X, Y, and Z coordinates. Also, each time the sensor trips a sphere, and the manipulator is stopped, three pieces of position data are collected, namely the X, Y, and Z coordinates assigned to that particular sphere. These position data represent the world reference frame.

The total number of position data should be at least equal to the number of parameters identifiable by measuring the position of the manipulator. For the IBM Enterprise, the minimum number of data pieces is 21. Three data pieces (X, Y, and Z) are gathered at each sphere. Thus, for the Enterprise, the spheres should be contacted at least seven times, yielding 21 pieces of data. For the PUMA, the spheres should be contacted at least nine times, yielding 27 pieces of data. Each sphere should be contacted at least once, and the same sphere should be contacted with the manipulator in different orientations, so that a different joint configuration is obtained each time.

After the data has been gathered and independent parameters identified, a regression analysis is performed to determine the best fit choice of parameters. This is done by minimizing the error between measured and calculated tool (or sensor) pose using standard regression techniques, such as the Newton-Raphson technique. The measured tool pose is that obtained by sensor trip point contact with the spheres, described above. The calculated tool pose is obtained by a kinematic model. One well-known kinematic model is the modified Hartenberg-Denavit model. Other kinematic models are discussed in "Kinematic Modelling for Robot Calibration," by Louis Everett, Morris Driels and Benjamin Mooring, *Robotics and Automation*, pp. 183-190, April 1987, which is hereby incorporated by reference.

In accordance with an appropriate kinematic model, the position of the tool or end effector is related to the joint positions of the manipulator via the equation:

$$^wT^t = {^wT^1}{^1T^2} \ldots {^{i-1}T^i} \ldots {^nT^t} \quad (1)$$

In this equation $^iT^j$ represents a four-by-four homogenous transform relating joint coordinate system j to i. Pose error can be expressed as:

$$^tT_c{^w}(^wT_m{^t} - {^wT_c{^t}}) = {^t\delta^t} \quad (2)$$

Here $^wT_c{^t}$ represents the tool pose relative to the world frame calculated via equation 1; $^wT_m{^t}$ is the measured pose; and $^t\delta^t$ is a four-by-four matrix with six independent terms representing the translation and orientation error in the two poses. The objective of identification is to select the unknown constants in the model so that $||^t\delta^t||$ is at a minimum. Equation 1 is expressed for every measurement taken. When multiple world reference frames are used, equation 2 is expressed for each world frame, thereby producing different solutions for each. If the measuring system used does not supply orientation information, then the orientation errors expressed in equation 2 are ignored.

After the independent parameters have been identified, the next step is implementation, i.e., using the calibrated model in the robot system. Because manipulation normally requires specifying a tool position, the forward model of equation 1 must be inverted. The left-hand side of equation 1 represents the tool position and/or orientation, which is a known quantity because it is specified. The right-hand side includes both constants and variables in the transforms which are to be solved. Thus, in order to find the variables, equation 1 is inverted. One method of implementation is depicted in Flow Chart 1.

With this calibrated model, one can "tell" the manipulator how to perform a given task by specifying the work space coordinates for the manipulator via the joint 20 configuration. Because the manipulator's work space is now defined in terms of joint configuration through the calibrated model, the operator of the manipulator may rely on the model's description of the work space coordinates to perform routine manipulator tasks.

FLOW CHART 1
Flow Chart of the Implementation Solution

Input Desired Transformations $^{w1}T^A$, $^{w2}T^B$

↓

Perform Offline Numerical Inverse Solution to Obtain Correct Joint Sets, $J_A$ and $J_B$

↓

Perform Forward Kinematics Using Simple Geometry to Obtain Modified Transformations $^{w}T^a$ and $^{w}T^b$

↓

Compute Real Time Inverse Solution for Trajectory Calculation Using Simple Geometry Model and Endpoints of $^{w}T^a$ and $^{w}T^b$ In order to use the calibrated model with the manipulator, one should use a standard application program. Referring to Flow Chart 1, the application program requires the manipulator to move in a coordinated manner between two points A and B. Point A, specified as $^{w1}T^A$, is an accurate tool pose relative to world reference frame one. Point B, specified as $^{w2}T^B$, is an accurate tool pose relative to world reference frame two. Using the calibrated model for world frames one and two, joint configurations $J_A$ and $J_B$ are determined, which correspond to points A and B. The ideal geometry forward model is used to compute modified tool positions $^{w}T^a$ and $^{w}T^b$. The inverse of the ideal forward model is then used to interpolate, in real time, an approximate straight line between $^{w}T^a$ and $^{w}T^b$. The resulting motion should be one with improved precision end points and a moderately straight path.

D. Multi-Sphere Coordinate Fixture

Another specific embodiment of the present invention is a multi-sphere coordinate fixture useful for calibration of manipulators. When a sensor is used to collect manipulator measurements for calibration purposes, a multi-sphere coordinate fixture may be used in conjunction with the sensor 14. Referring to FIGS. 1 and 6, in a specific embodiment of the invention, the coordinate fixture 80 includes at least three spheres 26 arranged to form a planar coordinate system. FIG. 1 shows a physical relationship between a robot manipulator 10 and a coordinate fixture 80 (the spheres are not shown in FIG. 1). Referring to FIG. 6, the spheres 26 are supported on a mounting member or fixture, optionally the base of the manipulator itself, but preferably a movable flat plate 82. The plate 82 is moveable to different locations within the work space, and is preferably located in the same approximate location as a workpiece. At each corner of the top side of the plate 82 are aluminum cylindrical posts $P_1$, $P_2$, $P_3$ and $P_4$ which have holes drilled axially to receive the shanks 27 attached to each sphere 26. Of course, a variety of means may be employed to mount spheres to a plate 82 to make a coordinate fixture 80. Each sphere 26 should be of a size so that the sensor is capable of trip point contact with the sphere 26 (see, e.g., FIGS. 4 and 5).

It has been found that, for a half-inch diameter sphere, the optimal distance between the centers of each sphere 26 attached to the plate 82 is between about 10 and 20 inches. The exact distance, however, is not critical. Nor is the location of the spheres on the plate critical. They need not, for example, form a right angle configuration, since any three spheres, regardless of location, will define a plane. However, once the spheres 26 have been affixed to a plate 82, it is important to measure the distance between the centers of the spheres as precisely as possible. The X-Y-Z coordinates may be obtained using a conventional coordinate measuring device, such as a milling machine. One of the spheres is assigned the origin and given the coordinates (0,0,0). The coordinates of the other spheres can then be determined in relation to the origin sphere.

Referring to FIG. 3, sphere 26 may be a commercially available, half-inch diameter tooling ball, preferably supplied with a shank 27 so that it may be mounted to the aluminum cylindrical posts P1, P2, P3, P4 attached to the plate 82. The size of the sphere 26 shown in FIG. 3 is slightly larger than necessary for trip point contact with the sensor 14. FIG. 1 shows how a coordinate device, such as the one in FIG. 6, can be placed within reach of a robot manipulator. Example 3 discusses this coordinate fixture in terms of an actual calibration procedure.

E. Sensor Calibration Apparatus and Procedure

Figure 8:
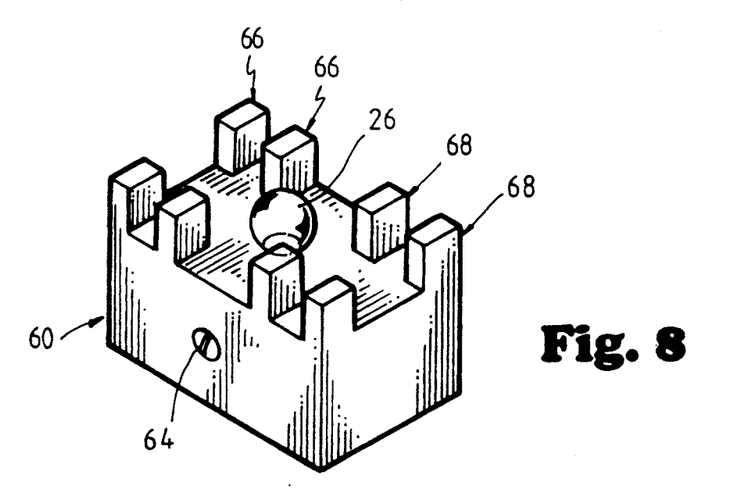
FIG. 8 is a perspective view of a sensor calibration device.
Figure 9:
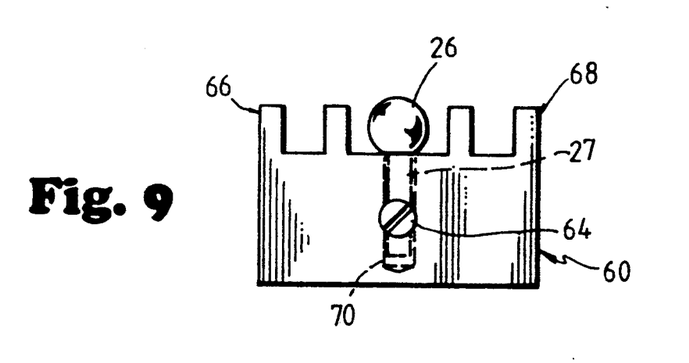
FIG. 9 is a side view of the sensor calibration device of FIG. 8.

Another specific embodiment of the present invention comprises a sensor calibration apparatus and a method for calibrating a sensor. In a broad aspect, and referring to FIGS. 8-9, one method of calibrating a sensor includes clamping a sensor like that shown in FIGS. 4 and 5 to a calibration fixture 60 so that the sensor housing 16 is positioned in inverted-U fashion with the light beams 18 in trip point contact with the sphere 26. More specifically, the method comprises inserting the sphere 26 to the fixture 60 by way of a peg or shank 27 which is inserted into a bore 70 in the fixture 60. The sphere 26 which is vertically slideable may be grossly positioned by hand and clamped rigidly to the fixture using a set screw 64. Next, the sensor 14 is clamped upside down to the calibration fixture 60 by engaging each of the two facing sides (16a, 16b) of the housing 16 with, respectively, the calibration fixture prongs 66, 68 so that the beams 18 cross the space between the prongs 66 and 68 to make trip point contact with the sphere 26. Conventional devices such as calipers may then be used to measure the position of the sphere 26 relative to the sensor 14.

In a preferred embodiment of the calibration method, to operate the calibration fixture 60, a sensor 14 (see FIG. 2) is clamped into the fixture 60, the sensitivity of each light receiver 22 is set approximately midrange, and the sphere 26 mounted in the calibration fixture is positioned so that it is near the sensor's trip point and clamped using the set screw 64. Because the sensor 14 and sphere 26 are now fixed relative to each other, a constant amount of light coming from each transmitter impinges on its respective receiver. By slowly adjusting the sensitivity of each light receiver, the receivers can be made to activate a switch in response to a preselected amount of light. As a receiver's sensitivity is changed, there will come a point where the receiver just barely "recognizes" the presence of the impinging light. When all three receivers are properly adjusted, the sphere in the fixture is at the trip point relationship to the sensor. Calipers a milling machine, or a coordinate measuring device may then be used to determine the location of the sphere 26 relative to the sensor housing 16. These same receiver sensitivities should be maintained when the sensor is used for locating the sphere 26 during manipulator calibration, i.e., when the sphere 26 is part of a coordinate fixture 80. Example 1 discusses a procedure where actual sensor calibration was carried out.

F. Multi-Sphere Orientation Fixture

Figure 7:
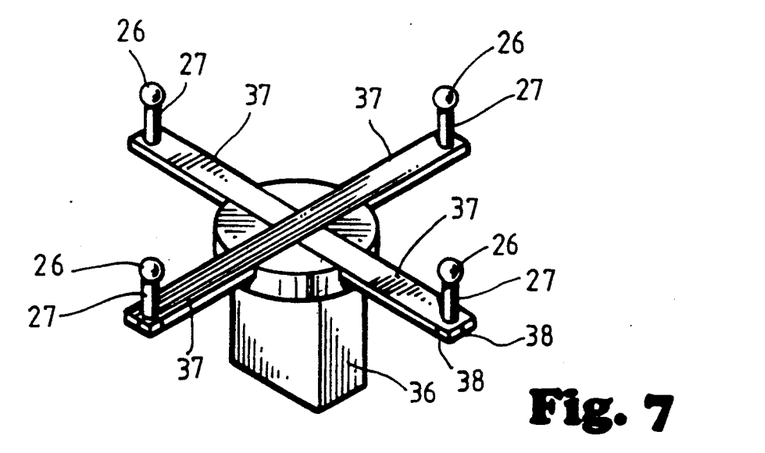
FIG. 7 is a multi-sphere orientation fixture which may be affixed to the end of a manipulator tool.

In addition to gathering position information about the robot manipulator, it may also be desirable to gather orientation information. Orientation data often gives a more complete calibration than does position data alone. Referring to FIG. 7, it has been found that a multi-sphere coordinate fixture small enough to be attached to the tool of a robot manipulator is able to gather such orientation data when brought into a trip point relationship with a sensor, when the sensor is placed in a manipulator work space.

The precision multi-sphere fixture 36 may be held in a manipulator tool. When brought into repeated trip point contact with a sensor 14, which is placed in the work space, orientation information may be gathered and the manipulator may be calibrated. Here it is desirable to have a manipulator-held fixture 36 with at least four spheres 26. Referring to FIG. 7, each sphere 26 is mounted on a crossbar 37 by inserting the shank 27 into a borehole (not shown) at each respective end of each crossbar 37. The spheres 26 may be positioned vertically by moving them up or down and tightening the set screws 38 at the desired height. The multi-sphere fixture need not, however, use crossbar 37. It may, for example, comprise 4 spheres mounted on a plate in a manner similar to the coordinate fixture of FIG. 6.

To gather orientation information with the orientation fixture, a sensor 14 is placed within reach of the manipulator arm 10. The multi-sphere orientation fixture 36 is attached to the manipulator. In the same manner as discussed earlier with the multi-sphere coordinate fixture 80, a coordinate system is defined, using three of the four spheres 26 on the orientation fixture 36. One arbitrarily selected point, represented by a sphere 26, becomes the origin of the orientation fixture's reference frame. The other points may be determined using a coordinate measuring device to measure the relationship between the spheres. Information is gathered using essentially the same procedure as for manipulator calibration (see Section C). The spheres on the orientation fixture are each brought into trip point contact with the sensor a sufficient number of times to collect sufficient joint value information for calibration. The resulting joint values and orientation data may be used with a computer model to achieve manipulator calibration.

EXAMPLE 1

In this example, the sensor calibration fixture 60 was operated to calibrate a sensor 14 and to identify the trip point in a measurable way. Once the sensor was clamped to the sensor calibration device 60 shown in FIGS. 8 and 9, the sphere 26 was positioned so that trip point relationship with the light beams 18 was achieved, with sensitivity set at midrange. Measurements were made to determine the extent to which the trip point could be moved with the technique described in Section E. Each light beam's sensitivity was then manipulated without changing the position of the sphere. The results are summarized in Table 1. $R_1$, $R_2$, and $R_3$ refer to receivers one, two, and three. An entry of 0 means the sensitivity is minimum, while an entry of 1 means maximum sensitivity. The x, y, and z columns represent the positions of the corresponding trip points, measured with a coordinate measuring machine. The data indicate that sensitivity adjustment may have an effect on the trip point's position.

TABLE 1

| Trip Points of the Position Sensor. | | | | | |
|---|---|---|---|---|---|
| $R_1$ | $R_2$ | $R_2$ | x | y | z |
| 0 | 0 | 0 | 7.32087 | 3.78135 | 3.20483 |
| 1 | 0 | 0 | 7.31028 | 3.76510 | 3.19764 |
| 0 | 1 | 0 | 7.32601 | 3.77006 | 3.20211 |
| 0 | 0 | 1 | 7.32421 | 3.82572 | 3.19458 |
| 1 | 1 | 0 | 7.31123 | 3.78423 | 3.20156 |
| 1 | 0 | 1 | 7.30204 | 3.81896 | 3.19450 |
| 0 | 1 | 1 | 7.32642 | 3.81007 | 3.19382 |
| 1 | 1 | 1 | 7.31347 | 3.79661 | 3.18820 |

EXAMPLE 2

This example shows the utility of the multi-sphere orientation fixture (FIG. 7), and how such a fixture provides for the gathering of orientation data for the tool frame. The results are simulated and do not represent data actually taken. Three of the four physical points on the orientation fixture may be used to define a coordinate system. One arbitrarily-selected point becomes the origin of the fixture reference frame. Another arbitrarily-selected point defines the X axis, and a third point defines the X, Y plane. The coordinates of the four points of the orientation fixture are measurable and are seen in equation 4.

$$\begin{bmatrix} 0 \\ 0 \\ 0 \\ 1 \end{bmatrix} = \begin{bmatrix} S_0 \\ 1 \end{bmatrix}; \tag{4}$$

$$\begin{bmatrix} x_1 \\ 0 \\ 0 \\ 1 \end{bmatrix} = \begin{bmatrix} S_1 \\ 1 \end{bmatrix};$$

$$\begin{bmatrix} X_2 \\ Y_2 \\ 0 \\ 1 \end{bmatrix} = \begin{bmatrix} S_2 \\ 1 \end{bmatrix};$$

$$\begin{bmatrix} X_3 \\ Y_3 \\ Z_3 \\ 1 \end{bmatrix} = \begin{bmatrix} S_3 \\ 1 \end{bmatrix}.$$

The pose of the tool relative to the world can be expressed using the various reference systems. The tool relative to the world can be found from:

$$^{w}T^{t} = {^{w}T^{s}} {^{s}T^{o}} {^{o}T^{t}} \tag{5}$$

Here, the homogeneous transform $^{w}T^{t}$ is the pose of the tool relative to the world (the desired result). The transform $^{w}T^{s}$ is the pose of the single point sensor reference relative to the world and can be accurately computed from the known joint configurations. The transform $^{s}T^{o}$, the pose of the orientation fixture relative to the sensor reference, is constant with respect to joint configuration. The transform $^{o}T^{t}$, the pose of the tool relative to the orientation fixture, is measurable. The objective is to compute the unknown transform $^{s}T^{o}$ to make the computation of $^{w}T^{t}$ possible.

Using equation 4, the sensor of this invention can determine an accurate relationship between joint configuration and the pose of the sensor reference. Referring to equation 5, the result of standard kinematic calibration can be expressed as the four-by-four homogeneous transformation $^{w}T^{s}$. Note that the relationship is well defined even though the orientation of the sensor frame is arbitrary. Of course the desired solution is to determine the unknown homogeneous transform $^{w}T^{t}$, which is the pose of the end effector or tool relative to the world.

To compute the unknown transform using the present invention, the fixture/sensor combination is used to collect position information. The sensing element is placed in a fixed position in the manipulator work space. The manipulator is driven so that each sphere on the orientation fixture trips the sensor. Based on the robot manipulator's joint configuration corresponding to each trip point, the unknown transform is computed using the following transform equation:

$$^{w}T^{o} = {^{w}T^{s}} {^{s}T^{o}} = {^{w}T^{s}} \begin{bmatrix} ^{s}\vec{n}^{o} & ^{s}\vec{o}^{o} & ^{s}\vec{a}^{o} & ^{s}\vec{p}^{o} \\ 0 & 0 & 0 & 1 \end{bmatrix} \tag{6}$$

When a given point i of the orientation fixture is brought into the sensor trip point, regardless of the approach direction, its coordinates in the world can be expressed as:

$$\begin{bmatrix} \vec{X} \\ 1 \end{bmatrix} = {^{w}T_{i}^{s}} \begin{bmatrix} ^{s}\vec{n}^{o} & ^{s}\vec{o}^{o} & ^{s}\vec{a}^{o} & ^{s}\vec{p}^{o} \\ 0 & 0 & 0 & 1 \end{bmatrix} \begin{bmatrix} S_i \\ 1 \end{bmatrix} \tag{7}$$

The vector $\vec{X}$ is a constant but unknown position. The transforms $^{w}T_{i}^{s}$ are computed based on the joint configuration corresponding to when i of the orientation fixture is at the sensor trip point. Rewriting equation 7 yields:

$$^{s}T_{i}^{w} \begin{bmatrix} \vec{X} \\ 1 \end{bmatrix} = \begin{bmatrix} ^{s}\vec{n}^{o} S_{wi} + {^{s}\vec{o}^{o}} S_{yi} + ({^{s}\vec{n}^{o}} \times {^{s}\vec{o}^{o}}) S_{zi} \\ 1 \end{bmatrix} + \begin{bmatrix} ^{s}\vec{p}^{o} \\ 0 \end{bmatrix} + {^{s}\vec{p}^{o}} \tag{8}$$

The terms $S_{xi}$, $S_{yi}$, and $S_{zi}$ are the x, y and z components of $S_i$. Equation 8 represents four matrix equations, each corresponding to a different point on the orientation sensor. By subtracting the equations corresponding to point zero from the other equations (and ignoring the fourth trivial row in the matrix equations) the following is obtained:

$$\left[ ({^{s}T_{1}^{w}} - {^{s}T_{0}^{w}}) \begin{bmatrix} \vec{X} \\ 1 \end{bmatrix} \right] / X_1 = ({^{s}\vec{n}^{o}}) \tag{9}$$

$$\left[ ({^{s}T_{2}^{w}} - {^{s}T_{0}^{w}}) \begin{bmatrix} \vec{X} \\ 1 \end{bmatrix} - X_2({^{s}\vec{n}^{o}}) \right] / Y_2 = ({^{s}\vec{o}^{o}})$$

$$({^{s}T_{3}^{w}} - {^{s}T_{0}^{w}}) \begin{bmatrix} \vec{X} \\ 1 \end{bmatrix} - X_3({^{s}\vec{n}^{o}}) - Y_3({^{s}\vec{o}^{o}}) - Z_3({^{s}\vec{n}^{o}} \times {^{s}\vec{o}^{o}})^t = 0$$

Equations 9 are a set of equations that can be iterated to compute the quantity $\vec{X}$. When $\vec{X}$ is known, equations 8 can be used for the unknown transformation $^{s}T^{0}$.

Note that there are no assumptions placed on the motion of the manipulator. Therefore, the algorithm should work for a variety of manipulators for which the orientation sensor may be brought into trip point relationship with the sensor.

Equations 9 are solved in this example to demonstrate their mathematical solution. To demonstrate the effects of measurement error, random normal deviates may be injected into simulated data. In the simulation, it is possible to control the amount of error entering the measurements, and therefore its effect on the solution can be studied. The simulation process is depicted in Flow Chart 2.

It is noted that the sensor may be placed in an unknown but fixed position $\vec{X}$ in the world reference. For the simulation, $\vec{X}$ was arbitrarily chosen as:

$$\vec{X} = (11.0, -2.0, 3.0)^t \text{ inches} \tag{10}$$

Thus, the unknown transformation $^{s}T^{0}$ (the desired result of the simulation) is arbitrarily chosen. By choosing $^{s}T^{0}$, it is possible to compute the remainder of the input data. When the input is known, equations 9 are solved. The result of equations 9 is compared to the chosen $^{s}T^{0}$ and $\vec{X}$.

When choosing transformations, it is important that they be consistent with the properties of transform matrices; therefore transforms are chosen by specifying screw matrix parameters. The screw axis, angle and displacement for matrix $^{s}T^{0}$ are chosen as:

$$(-0.5, 0.5, 0.707), 45°, (-2., 11., 3.) \text{ inches} \tag{11}$$

These parameters produce the following transformation matrix:

$$\begin{bmatrix} 0.7803301 & -0.5732233 & 0.2500000 & -2.000000 \\ 0.4267767 & 0.7803301 & 0.4571068 & 11.00000 \\ -0.4571068 & -0.2500000 & 0.8535534 & 3.000000 \\ 0 & 0 & 0 & 1 \end{bmatrix} = {}^{s}T^{o} \quad (12)$$

FLOW CHART 2
Flow Chart of the Simulation Procedure

Choose X and ${}^{s}T^{o}$

↓

Choose Orientation Components of ${}^{w}T_0{}^{s}, {}^{w}T_1{}^{s}, {}^{w}T_2{}^{s}, {}^{w}T_3{}^{s}$

↓

Choose $S_0, S_1, S_2, S_3$

↓

Compute Translation Components of ${}^{w}T_i{}^{s}$ Using Equation 15.

↓

Add Random Error to ${}^{w}T_i{}^{s}$

↓

Compute Error in ${}^{w}T_i{}^{s}$

↓

Iterate Equations 9 to Obtain ${}^{s}T^{o}$ and X

↓

Compute Error in ${}^{s}T^{o}$

↓

If Complete, Then Print Statistics

The next step is to compute the four matrices ${}^{w}T_i{}^{s}$ that represent the manipulator's sensor reference pose relative to the world when point i of the orientation fixture is placed at position $\bar{X}$. The orientation component of these matrices can be arbitrarily selected without violating any kinematic equations. Therefore their screw axes and angles were selected as:

$(-0.25, 0.5, 0.829), 30°$ $(0.5, 0.25, 0.829), 45°$ $(0.1, 0.75, 0.654), -15°$ $(0.75, 0.1, 0.654), 50°$ \hfill (13)

Next the positions of the points on the orientation reference are selected. Their positions relative to the orientation reference are arbitrary so they were initially selected (in inches) as:

$$\begin{bmatrix} 0 \\ 0 \\ 0 \\ 1 \end{bmatrix} = \begin{bmatrix} S_0 \\ 1 \end{bmatrix}; \quad (14)$$

$$\begin{bmatrix} 10 \\ 0 \\ 0 \\ 1 \end{bmatrix} = \begin{bmatrix} S_1 \\ 1 \end{bmatrix};$$

$$\begin{bmatrix} 10 \\ 10 \\ 0 \\ 1 \end{bmatrix} = \begin{bmatrix} S_2 \\ 1 \end{bmatrix};$$

$$\begin{bmatrix} 0 \\ 10 \\ 0 \\ 1 \end{bmatrix} = \begin{bmatrix} S_3 \\ 1 \end{bmatrix}$$

The only unknown input data at this point are the translation components of the matrices ${}^{w}T_i{}^{j}$. These are calculated from the following equations:

$$\begin{bmatrix} \vec{X} \\ 1 \end{bmatrix} = {}^{w}R_i{}^{s} {}^{s}T^{o} \begin{bmatrix} S_i \\ 1 \end{bmatrix} 1 - \begin{bmatrix} {}^{w}T_i{}^{s} \\ 1 \end{bmatrix} \quad (15)$$

Here ${}^{w}R_i{}^{s}$ is a pure rotation transformation matrix equivalent to the orientation part of ${}^{w}T_i{}^{s}$ and ${}^{w}\vec{P}_i{}^{S}$ is the translation component of ${}^{w}T_i{}^{s}$. The solution of equation 15 makes it possible to express the four ${}^{w}T^{s}$ matrices as:

$$\begin{bmatrix} 0.8744398 & 0.3971986 & -0.2785468 & 9.366833 \\ -0.4311531 & 0.8994911 & -0.07087093 & -12.54547 \\ 0.2224006 & 0.1820687 & 0.9578043 & -1.347170 \\ 0 & 0 & 0 & 1 \end{bmatrix} = {}^{w}T^{s}_{0m} \quad (16)$$

$$\begin{bmatrix} 0.7807935 & 0.6223629 & -0.0550087 & -2.964712 \\ -0.5499712 & 0.7264028 & 0.4121537 & -9.225114 \\ 0.2964677 & -0.2915537 & 0.9094523 & 7.144633 \\ 0 & 0 & 0 & 1 \end{bmatrix} = {}^{w}T^{s}_{1m}$$

$$\begin{bmatrix} 0.9665945 & -0.1658109 & 0.1954533 & 15.52145 \\ 0.1708459 & 0.9852560 & -0.0090689 & -24.85198 \\ -0.1910678 & 0.0421583 & 0.9806711 & 5.999934 \\ 0 & 0 & 0 & 1 \end{bmatrix} = {}^{w}T^{s}_{2m}$$

$$\begin{bmatrix} 0.8436117 & 0.5278046 & 0.0986999 & 7.633105 \\ -0.4738018 & 0.6452208 & 0.5993346 & -18.10223 \\ 0.2526483 & -0.5523698 & 0.7943906 & 14.97786 \\ 0 & 0 & 0 & 1 \end{bmatrix} = {}^{w}T^{s}_{3m}$$

The data in equations 14 and 16 may be used to iterate equations 9 to obtain the unknowns $\bar{X}$ and ${}^{s}T^{0}$. Below, measurement error is instead simulated to determine its effect on the solution.

To simulate measurement error, the four matrices given in equations 16 are modified. A normally distributed random number is added to the components of the screw parameters given in equation 3. Eight normal deviates with zero mean and a chosen standard deviation ($\sigma_a=0.001$) are generated and added to the x and y components of the four screw axis parameters. The four z components are determined so that the axis vector is a unit length. Four new normal deviates with zero mean and standard deviation $\sigma_a=0.1°$ are generated and added to the four angles in equation 13. From the modified screw parameters, modified orientation parts for ${}^wT_i^s$ are determined. Finally, twelve more zero mean normal deviates with standard deviation $\sigma_p=0.1$ inches are generated and added to the translation components of the matrices given in evaluation 16. One particular set of modified ${}^wT^s$ matrices follow:

$$\begin{bmatrix} 0.8743988 & 0.3978313 & -0.2777715 & 9.205970 \\ -0.4313249 & 0.8995190 & -0.06945706 & -12.54899 \\ 0.2222285 & 0.1805429 & 0.9581329 & -1.415914 \\ 0 & 0 & 0 & 1 \end{bmatrix} = {}^wT_0^s \quad (17)$$

$$\begin{bmatrix} 0.7803301 & 0.6229137 & -0.0553495 & -3.125949 \\ -0.5496903 & 0.7254126 & 0.4142669 & -9.234571 \\ 0.2982038 & -0.2928398 & 0.9084709 & 7.167713 \\ 0 & 0 & 0 & 1 \end{bmatrix} = {}^wT_1^s$$

$$\begin{bmatrix} 0.9662666 & -0.1666693 & 0.1963422 & 15.57589 \\ 0.1717805 & 0.9850926 & -0.009172767 & -24.77669 \\ -0.1918864 & 0.0425910 & 0.9804925 & 6.022668 \\ 0 & 0 & 0 & 1 \end{bmatrix} = {}^wT_2^s$$

$$\begin{bmatrix} 0.8437196 & 0.5276574 & 0.0985639 & 7.552853 \\ -0.4740756 & 0.6463597 & 0.5978891 & -18.11831 \\ 0.2517729 & -0.5511776 & 0.7954959 & 14.91298 \\ 0 & 0 & 0 & 1 \end{bmatrix} = {}^wT_3^s$$

From the four modified matrices of equation 17, equation 9 is solved for matrix ${}^sT^0$. To begin the process, an initial estimate of $\bar{X}$ is required. In all cases, the initial estimate of $\bar{X}$ is zero. When the matrices in equation 17 are used, the solution is:

$$\begin{bmatrix} 0.7847148 & -0.5669553 & 0.2497151 & -1.892561 \\ 0.4280652 & 0.7875659 & 0.4436474 & 11.01522 \\ -0.448311 & -0.2414573 & 0.8607085 & 2.018883 \\ 0 & 0 & 0 & 1 \end{bmatrix} \quad (18)$$

The simulation results express the error between matrices. Matrix error is calculated as the one norm (sum of absolute values) of matrix difference, e.g. Error=$||T_{Correct}-T_{Incorrect}||$. To obtain statistics, the simulation of measurement error was repeated multiple times. At each iteration, the process started with the correct screw parameters in equation 13 and correct translation components of ${}^wT^s$ in the fourth column of the matrices in equations 16. From this point, new random numbers were generated to determine modified ${}^wT^s$ matrices At each iteration, errors in the modified and original ${}^wT^s$ matrices were determined and recorded. After solution, the error between the computed and correct ${}^sT^0$ matrix was computed and recorded.

After n=100 iterations, the average input data error was computed as the sum of the ${}^wT^s$ errors divided by 4n=400. The mean solution error was computed as the sum of ${}^wT^s$ error divided by n=100. The sample standard deviations were similarly computed. Typical results are in Tables 2, 3 and 4.

Based on the results shown, the method appears to be a satisfactory way of completing the forward calibration problem when using a sensor of the present invention. The results of the technique indicate there is approximately a four-to-one amplification of measurement error arising from the solution of the calibration equations. The error seems to be slightly sensitive to the orientation fixture point spacing and may require consideration in designing the fixture. The method of solution was a standard zero crossing algorithm. It may be possible to obtain more accurate results with a minimization algorithm. Because the introduction of measurement error may cause the equations to have no solution, the minimization problem may be better defined.

In this example, the zero crossing algorithm was iterated 1000 times; if it did not reach convergence within that time, the last best estimate of $\bar{X}$ was used. The results given include the errors when the algorithm failed to converge. The algorithm used required the input of only four ${}^wT^s$ matrices; by collecting more data than necessary and averaging them, it may be possible to reduce the resulting error. To do this, one should define the problem as the minimization of an objective function, collect more data than necessary, and determine the best fit ${}^sT^0$ matrix.

TABLE 2

| Summary of Input Data and Results of the Simulation | | | |
|---|---|---|---|
| Correct x, y, z coordinates of $\bar{X}$ | 11. | −2. | 3. |
| Screw Parameters for ${}^wT^s$ | | | |
| x, y, components of Screw axis, θ | −.5 | .5 | 45. |
| x, y, z components of Displacement | −2. | 11. | 3. |
| Coordinates of point 0 of Orientation fixture | 0 | 0 | 0 |
| Coordinates of point 1 of Orientation fixture | 10 | 0 | 0 |
| Coordinates of point 2 of Orientation fixture | 10 | 10 | 0 |
| Coordinates of point 3 of Orientation fixture | 0 | 10 | 0 |
| Screw Parameters for ${}^wT_0^s$ | −.25 | .5 | 30. |
| x, y, components of Screw axis, θ | | | |
| Screw Parameters for ${}^wT_1^s$ | .5 | .25 | 45. |
| x, y, components of Screw axis, θ | | | |
| Screw Parameters for ${}^wT_2^s$ | .1 | .75 | −15. |
| x, y, components of Screw axis, θ | | | |
| Screw Parameters for ${}^wT_3^s$ | .75 | .1 | 50. |
| x, y, components of Screw axis, θ | | | |
| Standard deviation for Screw axis | 0.001 | | |
| Standard deviation for Screw angle | | 0.1 | |
| Standard deviation for Displacement | | | 0.1 |
| Number of iterations | 100 | | |
| Input Data Mean and Standard Deviation | 0.242 | 0.102 | |
| Resulting Mean and Standard Deviation | 0.713 | 0.378 | |

TABLE 3

| Summary of Input Data and Results of the Simulation | | | |
|---|---|---|---|
| Correct x, y, z coordinates of $\bar{X}$ | 11. | −2. | 3. |
| Screw Parameters for ${}^wT^s$ | | | |
| x, y, components of Screw axis, θ | −.5 | .5 | 45. |
| x, y, z components of Displacement | −2. | 11. | 3. |
| Coordinates of point 0 of Orientation fixture | 0 | 0 | 0 |
| Coordinates of point 1 of | 10 | 0 | 0 |

TABLE 3-continued

Summary of Input Data and Results of the Simulation

| | | | |
|---|---|---|---|
| Correct x, y, z coordinates of $\vec{X}$ | 11. | −2. | 3. |
| Orientation fixture | | | |
| Coordinates of point 2 of Orientation fixture | 10 | 10 | 0 |
| Coordinates of point 3 of Orientation fixture | 0 | 10 | 0 |
| Screw Parameters for $^wT_0{}^s$ x, y, components of Screw axis, θ | −.25 | .5 | 30. |
| Screw Parameters for $^wT_1{}^s$ x, y, components of Screw axis, θ | .5 | .25 | 45. |
| Screw parameters for $^wT_2{}^s$ x, y, components of Screw axis, θ | .1 | .75 | −15. |
| Screw Parameters for $^wT_3{}^s$ x, y, components of Screw axis, θ | .75 | .1 | 50. |
| Standard deviation for Screw axis | 0.001 | | |
| Standard deviation for Screw angle | | 0.1 | |
| Standard deviation for Displacement | | | 0.1 |
| Number of iterations | 1000 | | |
| Input Data Mean and Standard Deviation | 0.245 | 0.105 | |
| Resulting Mean and Standard Deviation | 0.752 | 0.391 | |

TABLE 4

Summary of Input Data and Results of the Simulation

| | | | |
|---|---|---|---|
| Correct x, y, z coordinates of $\vec{X}$ | 11. | −2. | 3. |
| Screw Parameters for $^wT^s$ | | | |
| x, y, components of Screw axis, θ | −.5 | .5 | 45. |
| x, y, z components of Displacement | −2. | 11. | 3. |
| Coordinates of point 0 of Orientation fixture | 0 | 0 | 0 |
| Coordinates of point 1 of Orientation fixture | 5 | 0 | 0 |
| Coordinates of point 2 of Orientation fixture | 5 | 5 | 0 |
| Coordinates of point 3 of Orientation fixture | 0 | 5 | 0 |
| Screw Parameters for $^wT_0{}^s$ x, y, components of Screw axis, θ | −.25 | .5 | 30. |
| Screw Parameters for $^wT_1{}^s$ x, y, components of Screw axis, θ | .5 | .25 | 45. |
| Screw Parameters for $^wT_2{}^s$ x, y, components of Screw axis, θ | .1 | .75 | −15. |
| Screw Parameters for $^wT_3{}^s$ x, y, components of Screw axis, θ | .75 | .1 | 50. |
| Standard deviation for Screw axis | 0.001 | | |
| Standard deviation for Screw angle | | 0.1 | |
| Standard deviation for Displacement | | | 0.1 |
| Number of iterations | 100 | | |
| Input Data Mean and Standard Deviation | 0.242 | 0.102 | |
| Resulting Mean and Standard Deviation | 0.787 | 0.397 | |

EXAMPLE 3

The kinematic parameters for the IBM Enterprise and 7565 manipulators were computed in accordance with the present invention.

Initially, a coordinate system discussed in Section D was defined in order to calibrate the manipulator. Three identical spheres 26 were used to uniquely define the coordinate fixture. Referring to FIG. 3, the spheres 26 used in this work are commercially available, half inch diameter tooling balls. Each sphere 26 has a shank 27 useful for mounting the sphere 26 to the plate 82. Each sphere shank assembly is mounted by drilling a hole axially in a post, and may be anchored to the post using a set screw (not shown). The posts in turn are mounted on a steel plate, fixture, or support member 82 placed in the robot work space. The position of each sphere is determined after construction via conventional measurement techniques.

The coordinate system used in this work is shown in FIG. 6. The fixture coordinate system was defined as follows. One sphere, $P_1$, is arbitrarily chosen as the origin and is assigned coordinates (0, 0, 0). The second sphere, $P_2$, is chosen to define the X-axis and is assigned coordinates ($X_2$, 0, 0). The third sphere, $P_4$, is used to define the X, Y plane and is assigned coordinates ($X_3$, $Y_3$, 0). The fourth sphere, $P_3$, is assigned coordinates ($X_4$, $Y_4$, $Z_4$). The fourth sphere is not necessary for calibration, but may be included for verifying accuracy.

After attaching the four spheres to the plate, their coordinates were measured. This was accomplished by placing the fixture in the vise of a milling machine and incrementing the stage until the sphere center was located under the chuck. By recording the coordinates of the milling machine's vise, it was possible to determine positions of the spheres relative to a coordinate system fixed in the vise. Milling machine measurements corresponding to the fixture used in this study were recorded; the measurements error was suspected to be ±0.002 inches.

The coordinates of each post relative to the fixture frame are determined via the coordinate transformation:

$$\begin{bmatrix} \vec{P_1} & \vec{P_2} & \vec{P_3} & \vec{P_4} \\ 1 & 1 & 1 & 1 \end{bmatrix} = \begin{bmatrix} \vec{n} & \vec{o} & \vec{a} & \vec{T} \\ 0 & 0 & 0 & 1 \end{bmatrix} \begin{bmatrix} 0 & X_2 & X_3 & X_4 \\ 0 & 0 & Y_3 & Y_4 \\ 0 & 0 & 0 & Z_4 \\ 1 & 1 & 1 & 1 \end{bmatrix}$$

The vector $\vec{P}_i$ represents the i'th sphere's position in milling machine coordinates. The unknown vectors $\vec{n}$, $\vec{o}$, $\vec{a}$, $\vec{t}$ and the unknown sphere coordinates in the fixture coordinate system are determined from the following equations:

$$\vec{t} = \vec{P_1}$$

$$X_2 = ||\vec{P_2} - \vec{P_1}||$$

$$\vec{n} = (\vec{P_2} - \vec{P_1})/X_2$$

$$X_3 = (\vec{P_3} - \vec{P_1}) \cdot \vec{n}$$

$$Y_3 = ||\vec{P_3} - \vec{P_1} - X_3\vec{n}||$$

$$\vec{o} = (\vec{P_3} - \vec{P_1} - X_3\vec{n})/Y_3$$

$$\vec{a} = \vec{n} - \vec{o}$$

The coordinates of the four spheres measured in the fixture coordinate system are given in Table 5. The uncertainty of these calculations is roughly three times the measurement error.

TABLE 5

Positions of spheres in fixture coordinates.

| Post | x | y | z |
|---|---|---|---|
| A | 0 | 0 | 0 |
| B | 12.4766 | 0 | 0 |
| C | 12.4878 | 12.5064 | 0.0106 |
| D | −0.0163 | 12.4712 | 0 |

Previous studies indicated that the specific position of the posts did not significantly affect calibration accuracy. Hence, the spheres did not need to be located at predetermined locations, nor was the spacing between them critical. Once positioned, however, it became important to accurately measure their positions.

The origin of the tool coordinate system was defined using a sensor held between the fingers or "peds" of the manipulator. This sensor, described previously, included three sensor members, was capable of trip point contact with the spheres, and was capable of accurately aligning one point fixed in the manipulator with the center of a sphere.

It was presumed that the number of independent kinematic parameters in the Enterprise was 24. Of these, three produce zero position error. It is possible, therefore, to identify 21 of the parameters by measuring manipulator position. It is noted, however, that each robot manipulator is different and hence may provide different parameters. It is possible, for example, to identify 27 parameters for the PUMA robot by measuring manipulator positions.

Each position measurement provided three pieces of data, namely, the X, Y, and Z coordinates of the manipulator. Therefore, the identification of 21 parameters would require a minimum of seven data points. However, the collecting of excess data improved the calibration, probably because the redundant data helped to average out measurement errors.

Data was collected in such a way that all joints were moved. If this is not done, the two links attached to the non-moving joint will appear to the algorithm as being a single link. Furthermore, since the algorithm will not be capable of differentiating between the non-moving links, their kinematic parameters will not be identifiable. It was also necessary to collect data from all three spheres attached to the fixture. Data from the fourth sphere was taken solely for verifying accuracy.

Data was collected via an AML routine which is similar to a conventional FINDPOST routine and which is a standard IBM application program. The data includes sets of joint values which occur when the manipulator is positioned at one of the spheres. It is necessary to note information, printed by the Series I processor, was typed into the VAX which runs the identification algorithm.

The manipulator was positioned by servoing in a direction dictated by the feedback from the position sensor. The initial positions were located by hand servoing. When the sensor tripped at one of the spheres, the Series I processor printed the joint values, and the manipulator proceeded to collect the next data point.

Once data was collected, the identification algorithm was executed on the VAX. The algorithm performed an iterative solution for the unknown kinematic parameters in the model. This process required an initial estimate of the parameters which was in the neighborhood of the correct values. The nominal kinematic parameters were used for this initial estimate. The data was manually typed into the VAX. This was done because the host communication port on the Series I was incompatible with the VAX ports.

The sensor was then tested for repeatability. The tests were performed by placing the sensor between the peds of the 7565 and repeatedly locating a fixed sphere. A unidirectional repeatability test comprising the following steps was performed:
1. Establishing ("teaching") a starting point for the manipulator;
2. automatically locating one sphere;
3. recording values of the first three joints as the position of the sphere;
4. automatically returning to the starting point;
5. repeating steps 2, 3 and 4 several times;
6. computing the average position of the sphere; and
7. computing the sensor repeatability as the distance between the individual measurements and the mean position.

This test was performed for 100 iterations at zero pitch, and again at 90° pitch. The results for zero pitch showed satisfactory repeatability.

An omnidirectional repeatability test comprised of the following steps was also performed:
1. Establishing ("teaching") a starting point for the manipulator;
2. automatically locating one sphere;
3. recording values of the first three joints as the position of the sphere;
4. establishing ("teaching") a new starting point;
5. repeating steps 2, 3 and 4 several times;
6. computing the average position of the sphere; and
7. computing the sensor repeatability as the distance between the individual measurements and the mean position.

This test was performed for 100 iterations at zero pitch only. The results also showed satisfactory repeatability.

Repeatability tests were also performed with the light beams at their highest intensity and then again at their lowest intensity. This test helped measure the sensor's repeatability of different intensities.

To summarize the results of the repeatability tests, the standard deviation ($\sigma$) of the sphere positions was computed. For unidirectional zero pitch, $\sigma$ is 0.0023 inches. For unidirectional, 90° pitch, $\sigma$ is 0.0032 inches. For unidirectional, zero pitch and highest intensity, $\sigma$ is 0.0023 inches. Finally for unidirectional, zero pitch and lowest intensity, $\sigma$ is 0.0032 inches.

It will be apparent, of course, that many modifications may be made in the above-described embodiments without departing from the scope of the invention, which is defined by the claims below.

For example, the invention may be used to help robot grippers grasp objects more effectively. If a three-sensor member sensor is built into or attached to a gripper, it is contemplated that the light-emitting and light-receiving members may be located on or close to the gripper's opposing fingers. When the workpiece, e.g., a bolt or silicon wafer, is brought into the trip point defined by the sensor light beams, the controller may then signal the robot to grasp the workpiece. Alternatively, sensor members may be designed to fit to the edges of a workpiece. Once all the sensor members are touched, the trip point, corresponding to the workpiece, has been located or "found." A controller responsive to the electronic signals from the sensor may then "tell" the robot to grasp the workpiece.

What is claimed:

1. A sensor for locating a spherical object, comprising:
    a support member;
    light beam transmitting means attached to the support member and adapted to transmit at least three light beams in tangential contact with the spherical object; and
    light beam detecting means attached to the support member and adapted to detect the light beams following such contact.

2. An apparatus for locating a spherical object comprising:
- a housing configured to receive the object; and
- a light beam transmitter and a light beam receiver attached to the housing and configured to transmit and receive light beams; wherein
- three light beams transmitted from the transmitter are capable of simultaneous point contact with the surface of the object at three spaced points on the surface of the object.

3. A sensor for locating a physical object, comprising:
- a housing attachable to a robot manipulator arm; and
- at least three sensor members affixed to the housing for contacting the physical object, said sensor members being affixed in a configuration which identifies at least one trip point when the sensor members are in simultaneous contact with the physical object, wherein the trip point is identified by contacting the sensor membes with the physical object, said contact being tangential when said object has a continuous curved surface.

4. A sensor as recited in claim 3 additionally comprising control means for moving the housing toward the object.

5. The sensor recited in claim 3 wherein the sensor additionally comprises a switch which tells a responsive controller the spatial position of any object corresponding to the trip point.

6. The sensor recited in claim 3 wherein the sensor members are light beams.

* * * * *